March 30, 1965     E. B. WEBER ETAL     3,175,276
ROTARY MILL
Filed Feb. 27, 1963
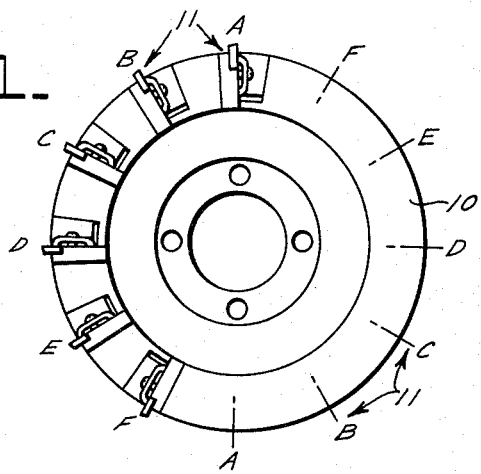
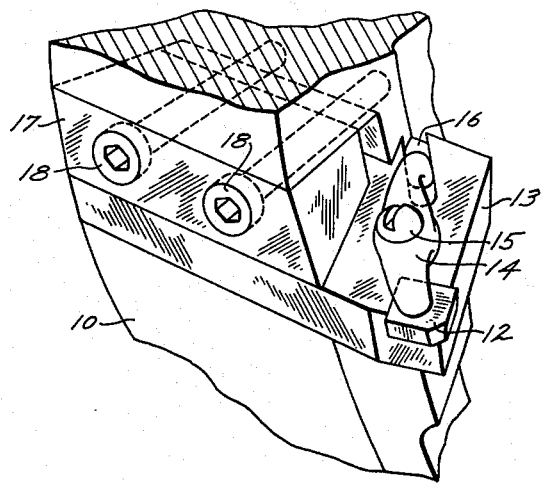
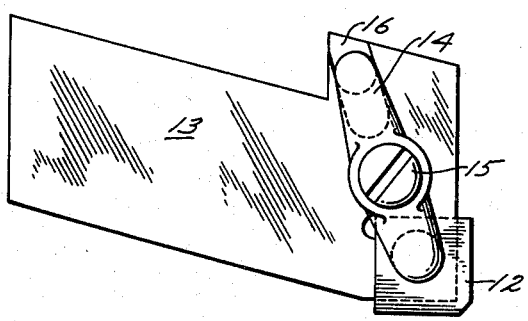
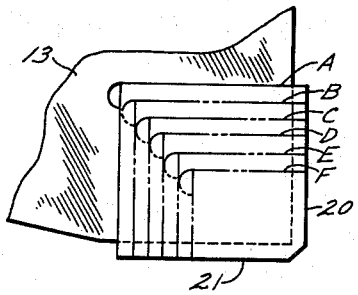
INVENTORS
EDWARD B. WEBER
JOHN W. ADDLER JR.
BY HENRY A. VOLK
*Fryer and Zinnwald*
ATTORNEYS

United States Patent Office 3,175,276
Patented Mar. 30, 1965

3,175,276
ROTARY MILL
Edward B. Weber, East Peoria, John W. Addler, Jr., Washington, and Henry A. Volk, Pekin, Ill., assignors to Caterpillar Tractor Co., Peoria, Ill., a corporation of California
Filed Feb. 27, 1963, Ser. No. 261,361
3 Claims. (Cl. 29—105)

This invention relates to milling machines and particularly to improvements in the milling heads of such machines which enables longer and more economical use of the machine tool inserts which form a part of the milling head.

Machine tool cutters are costly and it has been common practice to use small square cutters or inserts clamped in cartridges which are in turn secured to the head. As wear occurs on one edge of a set of cutters, they are rotated 90° in the clamping means and thus may be used four times without grinding and then discarded. Such cutters have become known in the trade as "throw away inserts." Cost studies have proven that this practice is wasteful because the discarded inserts have a substantial amount of carbide or useable stock capable of further use upon regrinding. Furthermore rotating the inserts often proves unsatisfactory because the roughened or uneven edges resulting from use do not seat well in the pockets provided for their reception and the inserts are, therefore, not uniformly positioned with respect to the head.

It is, therefore, an object of the present invention to provide a milling cutter with means to enable the repeated use and regrinding of small throwaway type inserts. The manner in which this object is accomplished and further and more specific objects and advantages of the invention are made apparent in the following specification wherein the invention is described in detail by reference to the accompanying drawing.

In the drawing:

FIG. 1 is a view in elevation of a typical rotary mill head with only half of the cutters shown in place thereon;

FIG. 2 is an enlarged fragmentary perspective view of one cutter assembly in a mill head such as that shown in FIG. 1;

FIG. 3 is a plan view of a cartridge and cutter removed from the mill head; and

FIG. 4 is a schematic view illustrating the progressively diminishing size of pockets in a cartridge to enable movement of inserts from large pockets to smaller pockets to accommodate for wear.

Referring first to FIG. 1, a well known type of rotary mill head is indicated at 10 as having a plurality of radially extending cutter assemblies, generally indicated at 11. A single cutter assembly is illustrated in greater detail in FIG. 2 wherein a small machine tool insert 12 is shown as clamped in a rectangular pocket in one corner of a cartridge 13, the appearance of which is illustrated in FIG. 3. A small clamp 14 holds the insert in place upon tightening of a screw 15 which passes through the clamp and into a threaded hole, not shown, in the cartridge. One end of the clamp fits into a groove 16 in the cartridge to prevent rotation of the clamp about the screw 15. The cartridge is conventionally held in a suitable slot formed in the periphery of the mill head by a wedge 17 and capscrews represented at 18.

According to the present invention, the cartridges 13 are provided with rectangular tool insert pockets which are progressively smaller in groups. For example, the mill shown in FIG. 1 has two groups of cartridge positions indicated as A to F so that there are six cartridges in each group. The pockets in the corners of the cartridges A to F are schematically represented in FIG. 4 as becoming progressively smaller. The difference in size is considerably exaggerated in the drawing. In practice, the sizes of the pockets in a group will vary in increments of approximately .03 inch though this increment may also vary considerably with mills of different sizes and used for different types of work. In practice, inserts of the same size, if new, or of different sizes if used inserts are employed are secured in place in all of the pockets in the manner illustrated in FIGS. 2 and 3 and then ground in a conventional grinding machine while the mill head is being rotated so that all radial and laterally extending edges of the inserts project equally from the mill head as indicated by the lateral edges 20 and radial edges 21 of the insert positions illustrated in FIG. 4. When the cutting edges of the inserts have worn sufficiently to require regrinding, the small insert at position F is discarded, all of the inserts from A to E are moved forwardly one position and a new insert is inserted at A before regrinding takes place. Consequently only two inserts are discarded from a twelve position mill and the useable stock in the remaining inserts is not wasted.

The number of groups of inserts and the number of inserts in each group may of course be varied with different types and sizes of mills.

We claim:

1. In a rotary mill head for a milling machine which has a plurality of peripherally spaced stations presenting pockets for the reception of hardened cutter inserts, the improvement which comprises the provision of pockets of progressively diminishing size in succeeding stations whereby inserts may be advanced to smaller pockets before regrinding necessitated by wear and in which the pockets diminish in size in equal increments.

2. The improvement of claim 1 in which the stations are divided into groups, and each group of stations has pockets progressively diminishing in size.

3. The improvement of claim 1 in which the pockets are formed in a corner of a cartridge secured at each station to present a radial and a lateral cutting edge of each insert, and in which the pockets diminish in size in both lateral and radial dimensions.

References Cited by the Examiner
UNITED STATES PATENTS

| | | | |
|---|---|---|---|
| 1,144,131 | 6/15 | Hunter | 29—105 |
| 2,081,639 | 5/37 | Perry. | |
| 2,805,467 | 9/57 | Greenleaf | 29—105 |
| 2,805,469 | 9/57 | Greenleaf | 29—105 |
| 2,982,008 | 5/61 | Facknitz | 29—96 |

WILLIAM W. DYER, Jr., *Primary Examiner.*